(12) United States Patent
Kosaka

(10) Patent No.: US 8,406,099 B2
(45) Date of Patent: Mar. 26, 2013

(54) OPTICAL DISC APPARATUS, FOCUS SEARCH METHOD, AND FOCUS SEARCH PROGRAM

(75) Inventor: Kaoru Kosaka, Hachiouji (JP)

(73) Assignee: JVC KENWOOD Corporation, Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 13/329,535

(22) Filed: Dec. 19, 2011

(65) Prior Publication Data

US 2012/0163153 A1 Jun. 28, 2012

(30) Foreign Application Priority Data

Dec. 22, 2010 (JP) ................................ 2010-285705

(51) Int. Cl.
*G11B 7/00* (2006.01)
(52) U.S. Cl. ..................... 369/44.26; 369/94; 369/53.22
(58) Field of Classification Search ............... 369/44.25, 369/44.26, 275.3, 94, 53.22, 47.27, 53.27, 369/53.23, 53.28, 53.37
See application file for complete search history.

(56) References Cited

U.S. PATENT DOCUMENTS 7,317,673 B2 * 1/2008 Yu .............................. 369/53.23

FOREIGN PATENT DOCUMENTS

| JP | 1-243244 | 9/1989 |
| JP | 2001331949 A | 11/2001 |

OTHER PUBLICATIONS

Translation of Official Action from Japanese Patent Office (priority JP Patent Application No. 2010-285705) (1 page—dated Nov. 13, 2012).

* cited by examiner

*Primary Examiner* — Nabil Hindi
(74) *Attorney, Agent, or Firm* — Renner, Kenner, Greive, Bobak, Taylor & Weber

(57) ABSTRACT

A focus search is performed for an optical disc. A focus drive voltage is output for moving an objective lens in a thickness direction of an optical disc. An average value of focus drive voltages is acquired and recorded while the optical disc is rotating at least one time in an in-focus condition in which a laser beam emitted via the objective lens is in focus to a data layer of the optical disc. A closest-position voltage is set based on the average value, the closest-position voltage being a focus drive voltage at which the objective lens is moved closest to the optical disc in a focus search that is performed after the average value has been recorded. The focus search is performed by moving the objective lens between a specific starting position and a position corresponding to the closest-position voltage.

12 Claims, 2 Drawing Sheets

OPTICAL DISC APPARATUS, FOCUS SEARCH METHOD, AND FOCUS SEARCH PROGRAM

CROSS-REFERENCE TO RELATED APPLICATIONS

This application is based on and claims the benefit of priority from the prior Japanese Patent Application No. 2010-285705 filed on Dec. 22, 2010, the entire content of which is incorporated herein by reference.

BACKGROUND OF THE INVENTION

The present invention relates to an optical disc apparatus, a focus search method, and a focus search program that achieve a quick focus search to an optical disc.

Optical discs for which a laser beam is used in recording/reproduction have been in wide use as a storage medium for audio data, video data, and other several types of digital data. Representative of the optical discs are CD (Compact Disc), DVD (Digital Versatile Disc), BD (Blu-ray Disc), etc. Representative of data-writable optical discs are CD-R, CD-RW, DVD-RW, BD-R, etc.

When an optical disc of such types is installed in an optical disc apparatus, a focus search is performed to search for an in-focus position of a data layer (in which data is recorded) of an optical disc. In a conventional focus search: a laser beam is irradiated onto an optical disc while a focal position is being continuously shifted relative to a specific position on the optical disc installed in an optical disc apparatus, to acquire a focus error signal; and then, an in-focus position of a data layer of the optical disc is determined based on a zero-cross point on an S-curve (referred to as a FES curve, hereinafter) exhibited by the acquired focus error signal.

The shift of a focal position in the conventional focus search is performed with the movement of an objective lens of an optical disc apparatus towards an optical disc under control with a focus drive voltage. The objective lens could touch the optical disc if it is moved too close to the optical disc. Therefore, it is general for the conventional focus search that: the position of the objective lens located closest to an optical disc in an initial focus search for the optical disc that is installed for the first time is set to a position relatively remote from the optical disc; and a focus search is repeated while the objective lens is gradually moved closer to the optical disc. Therefore, the conventional focus search has a problem of a long operation time One technique to shorten the operation time of a focus search is to set a closest-position voltage that is a focus drive voltage at which an objective lens is moved closest to an optical disc, based on an in-focus position of an optical disc acquired beforehand. However, in a focus search, a peculiar in-focus position is acquired if an optical disc is inclined in an optical disc apparatus or is deformed. This is because, a FES curve is acquired by irradiating a laser beam onto a particular position on the optical disc. If a closest-position voltage is set based on a peculiar in-focus position acquired in such a condition, the closest-position voltage may be deviated from an appropriate value, thus causing a long operation time for a focus search for a next optical disc or collision of an objective lens with an optical disc.

One technique of a focus search is disclosed in Japanese Unexamined Patent Application Publication No. 01-243244. In this technique, a focus search is performed while an optical disc is rotating, to acquire a relatively average in-focus position even if the optical disc is inclined. However, in this technique, the focal position has to be shifted by a very small distance for each acquisition of an average value of a focus error signal, thus requiring a long operation time.

SUMMARY OF THE INVENTION

A purpose of the present invention is to provide an optical disc apparatus, a focus search method, and a focus search program that achieve a quick focus search with an appropriately set closest-position voltage.

The present invention provides an optical disc apparatus comprising: a focus-drive voltage output unit configured to output a focus drive voltage for moving an objective lens in a thickness direction of an optical disc; a focus-drive voltage acquisition unit configured to acquire at least one average value of focus drive voltages while the optical disc is rotating at least one time in an in-focus condition in which a laser beam emitted via the objective lens is in focus to a data layer of the optical disc and to record the average value in a recording unit; a voltage setting unit configured to set a closest-position voltage based on the average value, the closest-position voltage being a focus drive voltage at which the objective lens is moved closest to the optical disc in a focus search that is performed after the average value has been recorded in the recording unit; and a focus-search control unit configured to perform the focus search by moving the objective lens between a specific starting position and a position corresponding to the closest-position voltage.

Moreover, the present invention provides a focus search method comprising the steps of: outputting a focus drive voltage for moving an objective lens in a thickness direction of an optical disc; acquiring at least one average value of focus drive voltages while the optical disc is rotating at least one time in an in-focus condition in which a laser beam emitted via the objective lens is in focus to a data layer of the optical disc and recording the average value; setting a closest-position voltage based on the average value, the closest-position voltage being a focus drive voltage at which the objective lens is moved closest to the optical disc in a focus search that is performed after the average value has been recorded; and performing the focus search by moving the objective lens between a specific starting position and a position corresponding to the closest-position voltage.

Furthermore, the present invention provides a focus search program stored in a non-transitory computer readable medium, the program comprising: a program code of outputting a focus drive voltage for moving an objective lens in a thickness direction of an optical disc; a program code of acquiring at least one average value of focus drive voltages while the optical disc is rotating at least one time in an in-focus condition in which a laser beam emitted via the objective lens is in focus to a data layer of the optical disc and recording the average value; a program code of setting a closest-position voltage based on the average value, the closest-position voltage being a focus drive voltage at which the objective lens is moved closest to the optical disc in a focus search that is performed after the average value has been recorded; and a program code of performing the focus search by moving the objective lens between a specific starting position and a position corresponding to the closest-position voltage.

DETAILED DESCRIPTION OF PREFERRED EMBODIMENTS

Embodiments of an optical disc apparatus, a focus search method, and a focus search program according the present invention will be explained with reference to the attached drawings.

Figure 1:
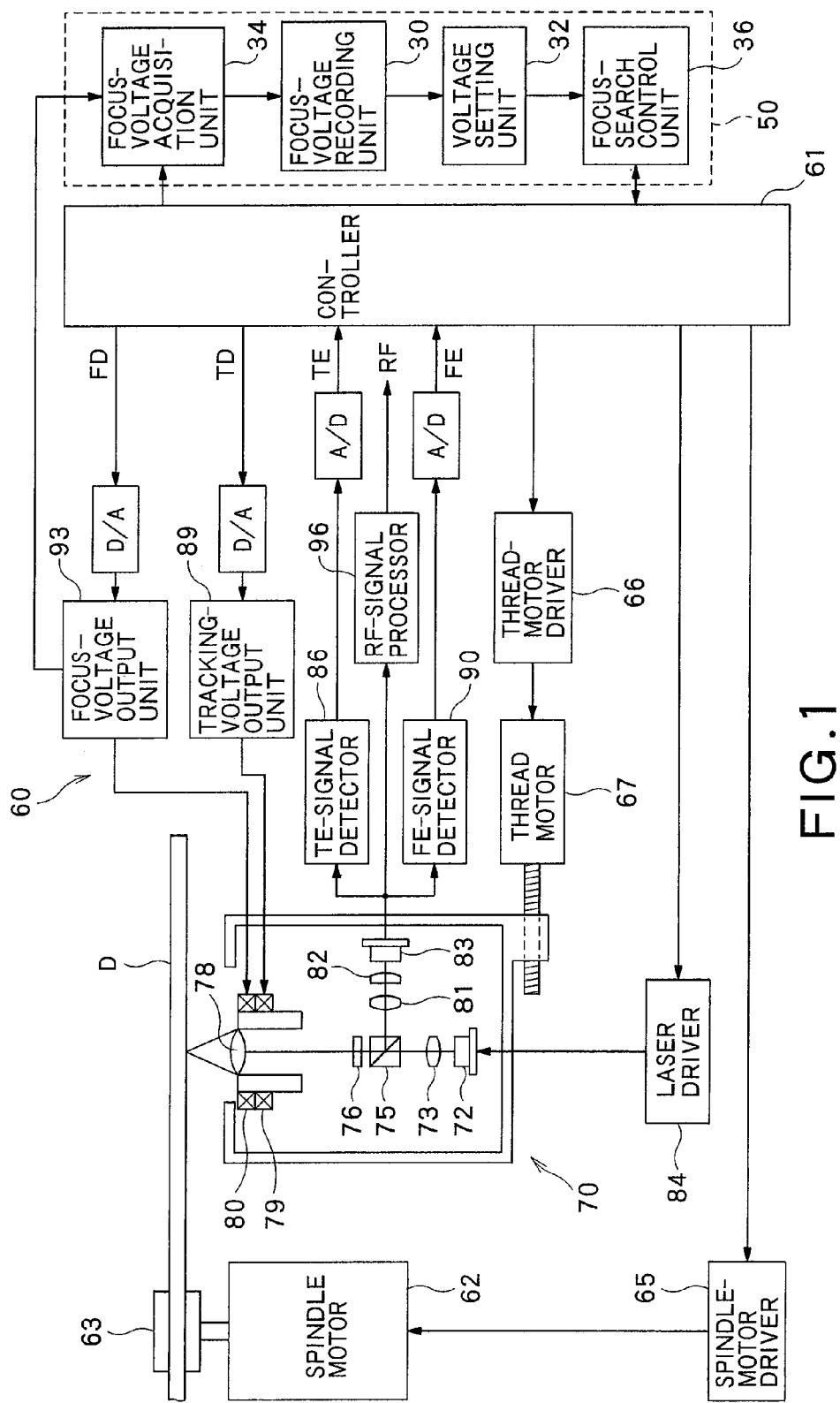
FIG. 1 is a block diagram schematically showing a configuration of an optical disc apparatus, according to the present invention.

Explained first is an operation of an optical disc apparatus 60 according to the present invention. FIG. 1 is a block diagram schematically showing a configuration of the optical disc apparatus 60. No detailed explanation is given to the elements in FIG. 1, such as an A/D converter, which are not directly related to the present invention.

The optical disc apparatus 60 is equipped with a turntable 63 to detachably clamp an optical disc D placed threreon. The turntable 63 is fixed to the rotary shaft of a spindle motor 62. The spindle motor 62 rotates at a specific rotating speed under an instruction from a controller 61 via a spindle-motor driver 65. When the spindle motor 62 rotates, the optical disc D placed on the turntable 63 also rotates at the specific rotating speed.

Provided under the optical disc D is an optical pickup device 70 connected to a sled motor 67. The controller 61 controls the rotation of the sled motor 67 so that the optical pickup device 70 moves in the radius direction of the optical disc D.

The optical pickup device 70 is equipped with a laser source 72 suitable for the optical disc D. The optical pickup device 70 is also equipped with several laser sources 72 for several types of optical discs D. The controller 61 controls the laser source 72 via a laser driver 84 so that the laser source 72 emits a laser beam having a specific wavelength. The emitted laser beam is converted into parallel beams via a collimator lens 73. The parallel beams pass through a beam splitter 75 and are then converted into circularly polarized beams by a $\lambda/4$ plate 76. The circularly polarized beams are converged and irradiated onto a data layer (in which data is recorded) of the optical disc D via an objective lens 78.

The irradiated laser beam is reflected by the data layer of the optical disc D and reaches the beam splitter 75 as a return beam via the objective lens 78 and the $\lambda/4$ plate 76. The return beam is then reflected by the beam splitter 75 and enters a multi-segment photodetector 83 via a detection lens 81 and a cylindrical lens 82.

The multi-segment photodetector 83 has a plurality of photoreceptive regions for detecting a return beam. A detected value output by the multi-segment photodetector 83 is output to a TE (tracking error)-signal detector 86 for tracking control, a FE (focus error)-signal detector 90 for focus control, and a RF-signal processor 96.

The TE-signal detector 86 performs specific computation to the detected value of the multi-segment photodetector 83 based on known DPD (Differential Phase Detection) to output a tracking error signal TE that is output to the controller 61 via an A/D converter.

The controller 61 generates a tracking-control drive signal TD based on the tracking error signal TE and outputs the drive signal TD to a tracking-voltage output unit 89 via a D/A converter. The tracking-voltage output unit 89 outputs a tracking drive voltage based on the tracking-control drive signal TD to a tracking coil 79. The tracking coil 79 is energized by the tracking drive voltage to move the objective lens 78 in the radius direction of the optical disc D, for tracking control.

In this embodiment, the known DPD is used for tracking control. Another known technique that can be used in the embodiment is DPP ((Differential Push Pull) with return beams. In the known DPP, a laser beam is separated into a main beam and two sub-beams, and the two sub-beams are used as the return beams.

The FE-signal detector 90 receives the output signal of the multi-segment photodetector 83 and performs specific computation based on known astigmatic focus-error detection to output a focus error signal FE to the controller 61 via an A/D converter.

The controller 61 generates a focus-control drive signal FD based on the focus error signal FE, that is output to a focus-voltage output unit 93 via a D/A converter. The focus-voltage output unit 93 outputs a focus drive voltage based on the focus-control drive signal FD to a focus coil 80. The focus coil 80 is energized by the focus drive voltage to move the objective lens 78 in the thickness direction of the optical disc D, for focus control.

The RF-signal processor 96 receives the output signal of the multi-segment photodetector 83 to obtain a main-data signal RF (a RF signal) stored in the data layer of the optical disc D, with known processing. The main-data signal RF is output to a reproduction apparatus (not shown) and output therefrom as a video or audio signal.

Moreover, as shown in FIG. 1, the optical disc apparatus 60 is provided with a focus search section 50 for controlling a focus search to the optical disc D. The focus search section 50 is equipped with: a focus-voltage acquisition unit 34 for acquiring at least one average value of focus drive voltages for at least one rotation of the optical disc D (or while the optical disc D is rotating at least one time) in an in-focus condition in which a laser beam emitted via the objective lens 78 is in focus to the data layer of the optical disc D; a focus-voltage recording unit 30 for recoding the average value of the focus drive voltages acquired for one rotation; a voltage setting unit 32 for setting a closest-position voltage (that is a focus drive voltage at which the objective lens 78 is moved closest to the optical disc D) in an initial focus search based on the average value of the focus drive voltages recorded in the focus-voltage recording unit 30; and a focus-search control unit 36 for performing the initial focus search when the optical disc D is installed in the optical disc apparatus 60, with the set closest-position voltage as the upper limit for the objective lens 78 to move between a specific starting position and a position corresponding to the set closest-position voltage.

The focus-voltage recording unit 30 can record a plurality of average values of focus drive voltages. The number of average values to be recorded is preferably in the range from 2 to 10, especially, 3 or 4 for a low-cost recording unit. Nevertheless, it is also possible that the focus-voltage recording unit 30 records one average value and then the focus-search control unit 36 performs a focus search based on the single average value. The focus-voltage recording unit 30 can be configured with a variety of types of storage or memory device.

Figure 2:
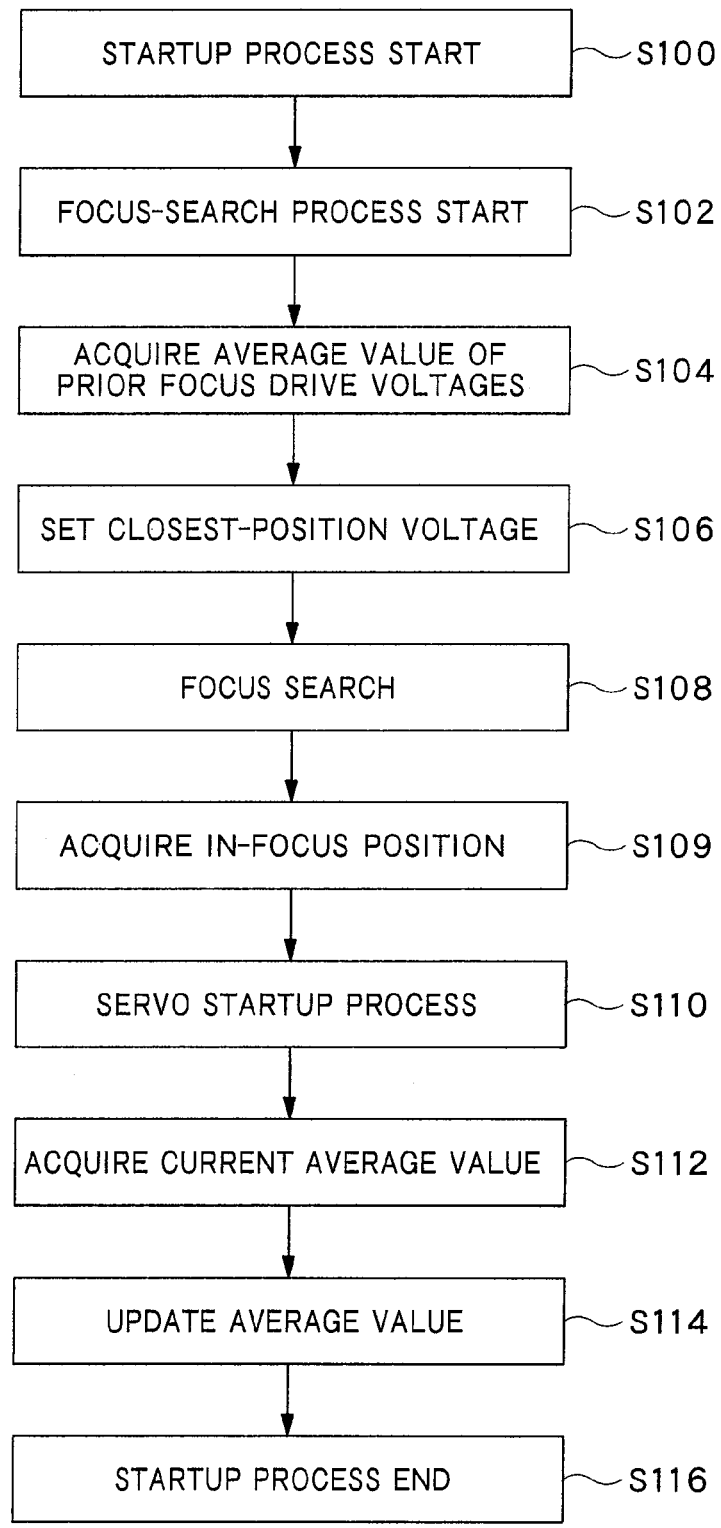
FIG. 2 is a flow chart explaining an operation of an optical disc apparatus, a focus search method, and a focus search program, according to the present invention.

Described next with reference to a flow chart of FIG. 2 is an operation of the optical disc apparatus 60, a focus search method, and a focus search program, according to the present invention. The operation described below is mainly performed by the focus search section 50. The flow chart of FIG. 2 shows a startup process for an optical disc D, with no description of other processes unrelated to the startup process in the present invention.

When an optical disc D is installed in the optical disc apparatus 60, the controller 61 starts a startup process to the optical disc D (step S100). Then, the controller 61 starts a focus search to search for an in-focus position of the optical disc D (step S102).

It is a precondition in the startup process of FIG. 2 that the startup process has already been performed a plurality of times for optical discs D, so that a specific number of average values of focus drive voltages acquired in step S112 (which will be explained later) has already been recorded in the focus-voltage recording unit 30.

When the focus search starts, the voltage setting unit 32 acquires a specific number of average values of prior focus drive voltages acquired beforehand and recorded in the focus-voltage recording unit 30 (step S104). Then, the voltage setting unit 32 calculates a disc average value that is the average value of the specific number of average values of the prior focus drive voltages.

The disc average value is calculated based on the average values of prior focus drive voltages at the in-focus position of each of optical discs D subjected to the startup process beforehand. Therefore, there is a high possibility that the focus-drive voltage at the in-focus position of an optical disc D now under the startup process is close to the disc average value. And, the S-curve from which an in-focus position is determined appears on both sides of the in-focus position (zero-cross point). Therefore, it is required to shift the focal position of a laser beam towards the optical disc D beyond the in-focus position to acquire an S-curve that exhibits appropriate characteristics for determining the in-focus position.

Accordingly, the voltage setting unit 32 sets the closest-position voltage to a specific focus drive voltage having a voltage level to move the objective lens 78 closer to the optical disc D by a specific distance than the distance (to the disc D) corresponding to the calculated disc average value (step S106).

The optical disc D subjected to the startup process beforehand and the optical disc D now under the startup process in this embodiment may be different from or the same as each other.

The specific distance treated in step S106 is preferably a distance one-half of the distance (a working distance at the disc average value) from the top of the objective lens 78 that is located at the position corresponding to the disc average value to the surface of the optical disc D. The position of the surface of the optical disc D that is located at the working distance at the disc average value is a known value depending on the type of the optical disc D and is pre-stored in the focus-voltage recording unit 30 or another storage device.

The specific distance described above may be a value larger than zero but smaller than a working distance at the disc average value. Nevertheless, the specific distance that is one-half of the working distance at the disc average value is most appropriate. This is because this distance gives the best balance between the prevention of the objective lens 78 to collide with the optical disc D and a quick focus search to the optical disc D.

Following to step S106, the focus-search control unit 36 performs a focus search at a specific starting position (a position remote from the optical disc D beyond the position corresponding to the closest-position voltage) with the closest-position voltage set by the voltage setting unit 32 as the upper limit, or as the focus drive voltage at which the objective lens 78 becomes closest to the optical disc D (step S108).

In detail, the focus-search control unit 36 moves the objective lens 78 between the specific starting position and the position corresponding to the closest-position voltage to acquire a FES curve to determine an in-focus position of a data layer of the installed optical disc D in accordance with a zero-cross point on the FES curve. If it is failed to acquire a FES curve, although not shown in the flow chart of FIG. 2, the voltage setting unit 32 resets the closest-position voltage to a focus drive voltage corresponding to a position more closer to the optical disc D and the focus-search control unit 36 performs a focus search again. The resetting of the closest-position voltage and the focus search are repeated until a FES curve is acquired.

As described above, the disc average value is calculated based on the average values of prior focus drive voltages at the in-focus position of each of optical discs D subjected to the startup beforehand, which gives a high possibility that the in-focus voltage at the in-focus position of the optical disc D now under the startup process is close to the disc average value. Moreover, the closest-position voltage is set within a voltage range for acquiring an appropriate FES curve, based on the disc average value.

Therefore, there is a high possibility of acquiring a FES curve of the optical disc D now under the startup process by a focus search at a focus drive voltage up to the closest-position voltage. Accordingly, as long as the optical disc D is a normal disc, it is possible to acquire a FES curve of the optical disc D now under the startup process by an initial focus search, thus achieving a short operation time for the focus search.

Following to step S108, the controller 61 determines a zero-cross point on the acquired FES curve, via the FE-signal detector 90, to acquire an in-focus position of the optical disc D now under the startup process (step S109). Next, the controller 61 performs a servo startup process concerning the serve mechanism (step S110), as one of the steps in the startup process. In the servo startup process, the optical disc D rotates at a specific rotating speed and is controlled to the acquired in-focus position under focus control.

While the optical disc D is under focus control, the focus-voltage acquisition unit 34 acquires an average value (the current average value) of focus drive voltages for one rotation of the optical disc D now under the startup process and in the in-focus condition (step S112). The average value of focus drive voltages is acquired in a manner, for example, that the focus-voltage acquisition unit 34 acquires focus drive voltages output from the focus-voltage output unit 93, for a specific period corresponding to one rotation of the optical disc D, adds up the focus drive voltages, and dividing the added-up value by the number of times of acquisition of the focus drive voltages. It is preferable that the acquisition of the average value in step S112 is performed just before the completion of the servo startup process.

Moreover, not only for one rotation of the optical disc D, the focus-voltage acquisition unit 34 may acquire an average value of focus drive voltages at an N times (N being a natural number) of rotations of the optical disc D now under the startup process and in the in-focus condition under focus control. In other words, it is preferable for the focus-voltage acquisition unit 34 to acquire an average value of focus drive voltages at, at least, one rotation of the optical disc D now under the startup process and in the in-focus condition under focus control.

Next, the focus-voltage acquisition unit 34 records the acquired average value in the focus-voltage recording unit 30. Then, the focus-voltage recording unit 30 updates the recorded average value, using the current average value recorded by the focus-voltage acquisition unit 34, with the deletion of the oldest recorded average value if a plurality of average values have been recorded (step S114).

When all steps of the startup process are complete, the controller 61 finishes the startup process to the optical disc D (step S116). After the startup process, the voltage setting unit 32 sets a closest-position voltage for the next focus search, based on the currently recorded or updated average value. The next focus search may be performed to a newly installed optical disc D or the same disc as the optical disc D for which the average value has been recorded in step S114.

In the initial condition in which no startup process has been conducted for any optical disc D, a focus search may be conducted by a known technique or conducted with a standard average value pre-stored in the focus-voltage recording unit 30.

Optical discs D have different distances from the disc surface to the data layer in the in-focus condition. Therefore, the optical discs D have different working distances from the top of the objective lens 78 to the disc surface in the in-focus condition, depending on the disc type. The distance from the disc surface to the data layer is, for example, about 1.1 mm for CD, about 0.6 mm for DVD, and about 0.1 mm for BD. Therefore, the most appropriate distance for the objective lens 78 to be raised from the disc surface is also different among different type of optical discs D. Accordingly, there is a big difference in the focus drive voltage at the in-focus position among different types of optical discs D. Nevertheless, since the location of the data layer is determined in accordance with the disc type, it is possible that the focus-voltage recording unit 30 or another storage device pre-stores standard disc average values for different types of optical discs D to determine the difference in the focus drive voltage depending on the relative difference in working distance among different types of optical discs D in the in-focus condition.

Therefore, in order for the optical disc apparatus 60 to be compatible with different types of optical discs D, the focus-voltage acquisition unit 34 may correct an acquired average value of focus drive voltages with correction values obtained beforehand for the focus drive voltage among different types of optical discs D and record the corrected average value in the focus-voltage recording unit 30. With the correction values described above, it is possible to acquire an average value of focus drive voltages irrespective of the type of optical disc D to be installed in the optical disc apparatus 60.

It is one requirement for the optical disc apparatus 60, when the correction values are set, that the average value to be recorded in the focus-voltage recording unit 30 be corrected to the average value for one type of optical disc D for which the working distance is the shortest, or the location of the objective lens 78 in the in-focus position is closest to the optical disc D, among different types of optical discs D.

Generally, BDs have a smaller working distance than DVDs. Therefore, in order for the optical disc apparatus 60 to be compatible with both of DVDs and BDs, the focus-voltage acquisition unit 34 corrects an average value of focus drive voltages acquired in the startup process for a DVD to an average value of focus drive voltages for a BD and records the corrected average value in the focus-voltage recording unit 30. The correction of the average value for a DVD to that for a BD is performed, for example, as follows: (A) a pre-stored offset value is subtracted from an average value of focus drive voltages acquired in the startup process for a DVD and a resultant value is set as the average value of focus drive voltages for a BD; or (B) an average value of focus drive voltages acquired in the startup process for a DVD is multiplied by a specific coefficient smaller than one and a resultant value is set as the average value of focus drive voltages for a BD.

With the average-value correction described above, the closest-position voltage can be set more accurately with average values of focus drive voltages for a variety of types of optical discs. When an optical disc D starts to rotate, the voltage setting unit 32 retrieves an average value of focus drive voltages from the focus-voltage recording unit 30, corrects the average value in accordance with the type of an installed optical dis D, and sets the closest-position voltage based on the corrected value.

The correction of the average value according to the example (B) described above will be explained in more detail. The distance from the disc surface to the data layer is, for example, about 1.1 mm for CD, about 0.6 mm for DVD, and about 0.1 mm for BD, as describe above. Therefore, the working distance is different among CD, DVD and BD depending on these distances, the laser spot size, the refractive index, etc. However, the ratio of working distance among CD, DVD and BD is roughly almost constant.

Using the ratio of working distance, the focus-voltage acquisition unit 34 corrects acquired average values for CD, DVD and BD to a same value. For example, at the focus-voltage acquisition unit 34, the average value of focus drive voltages for BD is corrected by being multiplied by X, that for DVD is corrected by being multiplied by Y, and that for CD is corrected by being multiplied by 1/Z. The X, Y and Z are coefficients smaller than one. The corrected average value is then recorded in the focus-voltage recording unit 30.

When a BD is installed in the optical disc apparatus 60 for the startup process, the voltage setting unit 32 retrieves the corrected average value from the focus-voltage recording unit 30, corrects retrieved average value by multiplying it by 1/X and sets the closest-position voltage for the BD based on the corrected average value. When a DVD is installed in the optical disc apparatus 60 for the startup process, the voltage setting unit 32 retrieves the corrected average value from the focus-voltage recording unit 30, corrects the retrieved average value by multiplying it by 1/Y and sets the closest-position voltage for the DVD based on the corrected average value. Moreover, when a CD is installed in the optical disc apparatus 60 for the startup process, the voltage setting unit 32 retrieves the corrected average value from the focus-voltage recording unit 30, corrects the retrieved average value by multiplying it by Z and sets the closest-position voltage for the CD based on the corrected average value.

As described above in detail, according to the present invention, the optical disc apparatus 60, the focus search method, and focus search program acquire the average value of focus drive voltages for one rotation of an optical disc D in the in-focus condition. Therefore, even if an optical disc D is inclined in the optical disc apparatus 60 when installed therein, an adverse effect of the inclination is diminished.

Moreover, according to the present invention, the average value of focus drive voltages is acquired by averaging average values for a plurality of optical discs D. Therefore, even if a deformed optical discs D is installed and a peculiar average value is acquired and recorded for the focus drive voltage, an adverse effect of the peculiar average value is diminished.

Moreover, according to the present invention, the closest-position voltage is set based on the average value of focus drive voltages acquired by averaging average values for a plurality of optical discs D, or based on the disc average value defined in the present invention, and an initial focus search is performed up to the closest-position voltage. The disc average value that is the basis of the closest-position voltage is acquired in the in-focus position. Therefore, there is a very high possibility that an appropriate FES curve can be acquired for a newly installed optical disc D with an initial focus search up to the closest-position voltage.

Accordingly, it is possible to acquire an appropriate FES curve with an initial focus search as long as an optical disc D is not defective, thus the present invention achieves a short operation time for a focus search. Moreover, the average value of focus drive voltages is updated in each startup process for an optical disc D. Therefore, the focus search can be performed appropriately with less effect of the aging of components of the optical disc apparatus 60 related to the focus control and/or focus search.

It is further understood by those skilled in the art that the foregoing description is a preferred embodiment of the disclosed device, method or program and that various changes and modifications may be made in the invention without departing from the sprit and scope thereof.

Moreover, a program running on a computer to achieve the search program described above is embodied in the present invention. Such a program may be retrieved from a storage medium or transferred over a network and installed in a computer.

As described above in detail, the present invention provides an optical disc apparatus, a focus search method, and a focus search program that achieve a quick focus search with an appropriately set closest-position voltage.

What is claimed is:

1. An optical disc apparatus comprising:
a focus-drive voltage output unit configured to output a focus drive voltage for moving an objective lens in a thickness direction of an optical disc;
a focus-drive voltage acquisition unit configured to acquire at least one average value of focus drive voltages while the optical disc is rotating at least one time in an in-focus condition in which a laser beam emitted via the objective lens is in focus to a data layer of the optical disc and to record the average value in a recording unit;
a voltage setting unit configured to set a closest-position voltage based on the average value, the closest-position voltage being a focus drive voltage at which the objective lens is moved closest to the optical disc in a focus search that is performed after the average value has been recorded in the recording unit; and
a focus-search control unit configured to perform the focus search by moving the objective lens between a specific starting position and a position corresponding to the closest-position voltage.

2. The optical disc apparatus according to claim 1 wherein the position corresponding to the closest-position voltage is closer to the optical disc by a specific distance than a specific position to the optical disc, the specific position corresponding to an average value that is an average of a plurality of average values acquired by the focus-drive voltage acquisition unit.

3. The optical disc apparatus according to claim 2 wherein the specific distance is one-half of a distance from a top of the objective lens that is located at the specific position to a surface of the optical disc.

4. The optical disc apparatus according to claim 1 wherein
the focus-drive voltage acquisition unit corrects average values of focus drive voltages acquired for different types of optical discs to a same average value using a correction value and records the same average value in the recording unit, and
the voltage setting unit retrieves the same average value from the recording unit, corrects the same average value to average values for the different types of optical discs and sets the closest-position voltage based on the average value thus corrected for each of the different types of optical discs.

5. A focus search method comprising the steps of:
outputting a focus drive voltage for moving an objective lens in a thickness direction of an optical disc;
acquiring at least one average value of focus drive voltages while the optical disc is rotating at least one time in an in-focus condition in which a laser beam emitted via the objective lens is in focus to a data layer of the optical disc and recording the average value;
setting a closest-position voltage based on the average value, the closest-position voltage being a focus drive voltage at which the objective lens is moved closest to the optical disc in a focus search that is performed after the average value has been recorded; and
performing the focus search by moving the objective lens between a specific starting position and a position corresponding to the closest-position voltage.

6. The focus search method according to claim 4 wherein the position corresponding to the closest-position voltage is closer to the optical disc by a specific distance than a specific position to the optical disc, the specific position corresponding to an average value that is an average of a plurality of acquired average values.

7. The focus search method according to claim 6 wherein the specific distance is one-half of a distance from a top of the objective lens that is located at the specific position to a surface of the optical disc.

8. The focus search method according to claim 5 further comprising the steps of:
correcting average values of focus drive voltages acquired for different types of optical discs to a same average value using a correction value and recording the same average value, and
retrieving the same average value, correcting the same average value to average values for the different types of optical discs and setting the closest-position voltage based on the average value thus corrected for each of the different types of optical discs.

9. A focus search program stored in a non-transitory computer readable medium, the program comprising:
a program code of outputting a focus drive voltage for moving an objective lens in a thickness direction of an optical disc;
a program code of acquiring at least one average value of focus drive voltages while the optical disc is rotating at least one time in an in-focus condition in which a laser beam emitted via the objective lens is in focus to a data layer of the optical disc and recording the average value;
a program code of setting a closest-position voltage based on the average value, the closest-position voltage being a focus drive voltage at which the objective lens is moved closest to the optical disc in a focus search that is performed after the average value has been recorded; and
a program code of performing the focus search by moving the objective lens between a specific starting position and a position corresponding to the closest-position voltage.

10. The focus search program according to claim 9 wherein the position corresponding to the closest-position voltage is closer to the optical disc by a specific distance than a specific position to the optical disc, the specific position corresponding to an average value that is an average of a plurality of acquired average values.

11. The focus search program according to claim 10 wherein the specific distance is one-half of a distance from a top of the objective lens that is located at the specific position to a surface of the optical disc.

12. The focus search program according to claim 9 further comprising:

a program code of correcting average values of focus drive voltages acquired for different types of optical discs to a same average value using a correction value and recording the same average value, and a program code of retrieving the same average value, correcting the same average value to average values for the different types of optical discs and setting the closest-position voltage based on the average value thus corrected for each of the different types of optical discs.

\* \* \* \* \*